Inventors
Grant Wheat
Homer A. Lozeau 2,709,238
Patented May 24, 1955

2,709,238

VOLTAGE CONTROL CIRCUIT

Grant Wheat, Marlboro, and Homer A. Lozeau, Worcester, Mass., assignors to Koehler Manufacturing Company, Marlboro, Mass., a corporation of Massachusetts Application May 17, 1951, Serial No. 226,798

5 Claims. (Cl. 320—35)

In the charging of storage batteries, it is desirable that the output voltage of the power supply vary inversely as a function of ambient temperature so as not to extend unduly the charging period at low temperatures or cause excessive electrolyte loss and possible damage to the batteries because of excessive charging rates at higher temperatures. Further, the regulation of the power supply should be such that the output voltage at any given temperature will remain substantially constant irrespective of load changes due to increases or decreases in the number of batteries being charged.

Accordingly it is the principal object of this invention to provide a control circuit which will regulate the output voltage of a power supply so that the voltage remains substantially constant under varying load conditions.

A further object is to provide a control circuit which will regulate the voltage of a power supply as a function of the ambient or other selected temperature.

Further objects are to provide a voltage regulation circuit which is particularly adapted to the charging of storage batteries, which is rugged, dependable and trouble free in operation, which is automatic, which requires a minimum of adjustments, which does not require a skilled operator, which is small in size, which is economical to operate and which advances the art generally.

The invention according to a principal aspect, contemplates an electronic circuit comprising a variable impedance which is interposed between the load and its power supply, such as being in series with the primary winding of the power transformer, and which is connected to the output circuit of a vacuum tube or like electronic valve means so that the effective value of the impedance is controlled in response to the magnitude of current flow through the tube. The voltage developed across the load is opposed by the voltage from a constant potential source, and the difference between the load voltage and the standard voltage is applied to the control tube, for example through an amplifier, thereby to vary the current flow through the tube so as to regulate the potential applied to the load.

In another principal aspect, a resistive element having a comparatively large temperature coefficient of resistance and a relatively high value resistive element which may be in the form of a meter are connected in series across the load. The voltage across this resistive element or meter is held constant by the voltage regulator, by varying the load voltage to that required to overcome any change in the temperature coefficient resistor caused by change in the ambient temperature. When, as in the case of a battery charger, it is desirable to have the voltage vary inversely to the ambient temperature, a negative temperature coefficient resistive element is used.

In another aspect, the variable impedance is a saturable core reactor having one or more alternating current windings which are interposed between the load and the power supply therefor. The saturation of the core is varied by a direct current winding whose excitation is controlled by the output current from the control tube.

A feature of the saturable core reactor is a short circuited winding which is positioned upon the core where it is subjected to the influence of substantially the same flux as the saturating winding so that the alternating flux due to instantaneous unbalanced harmonic voltages in the alternating current reactor windings is opposed by the flux resulting from the circulating current in the short circuited winding. Such short circuiting winding may be formed, for example by interposing a sleeve of an electrically conducting material between the core and the saturating winding; or by winding the saturating winding upon a spool of an electrically conducting material.

These and other objects, aspects and features will be apparent from the following description of a specific embodiment of the invention referring to drawings wherein.

Figure 1:
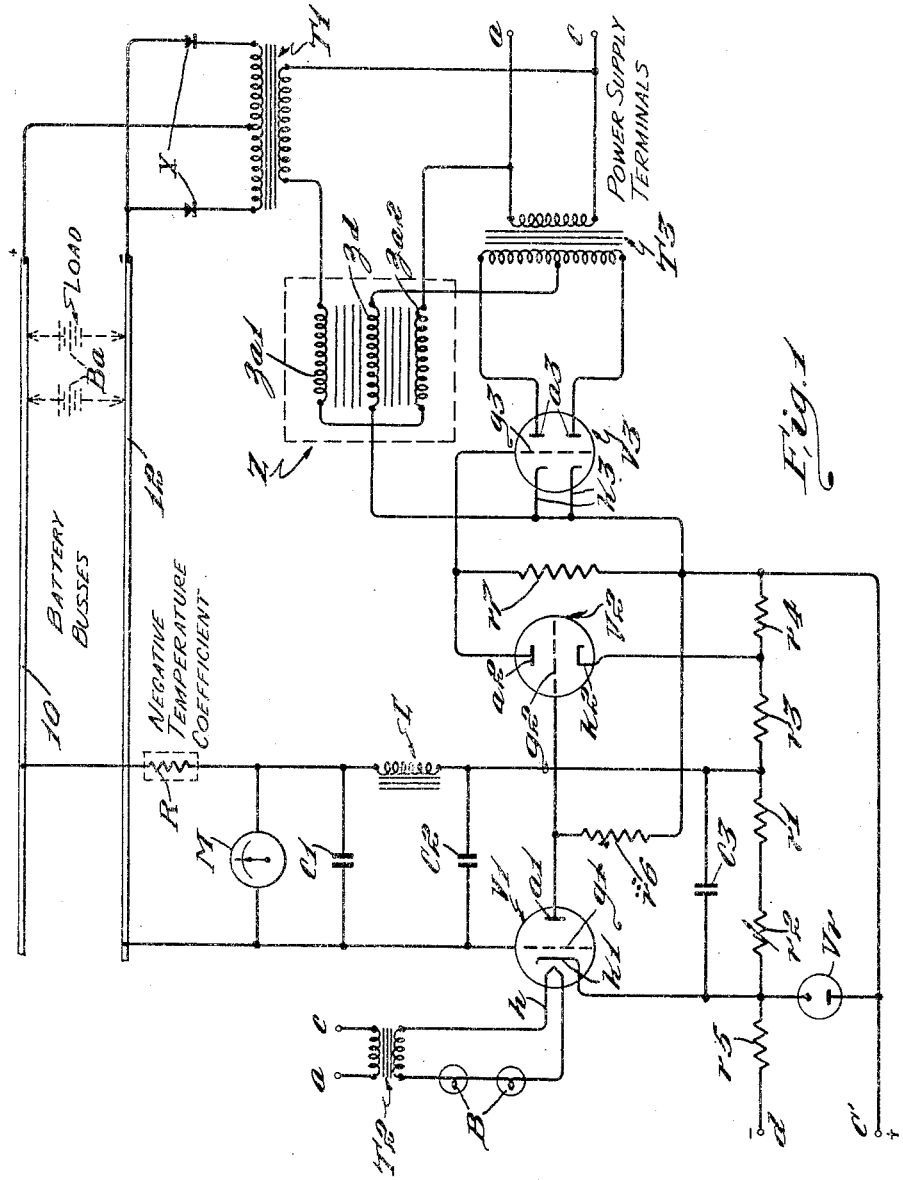
Fig. 1 is a wiring diagram of the control circuit.

The embodiment of the invention chosen for the purposes of illustration is particularly adapted to regulate the voltage of a pair of battery buses 10 and 12, such as are used in mine lamphouses to charge the lead acid cells for Wheat electric miners' cap lamps. As is best shown in Fig. 1, the buses 10 and 12 are energized from the terminals $a$ and $c$ of a conventional alternating power supply which may be of any of the usual voltages. The comparatively high voltage of the terminals $a$ and $c$ is stepped down by means of a transformer T1 whose primary winding is connected in series with the alternating current coils $za1$ and $za2$ of a saturable core reactor Z, whose function will be described in detail hereinafter, across the terminals $a$ and $c$. The center tap of the secondary winding of the transformer T1 is connected directly to the terminal of the positive bus 10 whereas the end terminals of the transformer secondary winding are each linked with the terminal of the negative bus 12 by a respective rectifier which is preferably of the selenium type.

Connected in series across the buses 10 and 12 are two resistive elements, such as the resistor R, whose function will be described hereinafter, and a resistive element having a comparatively high value such as a voltmeter M, which is not provided with a scale but has only a single mark to which its indicator is set as will be described hereinafter. It is to be understood that in instances where a continuous indication of the voltage is not required, the meter M can be replaced by a high value resistor. The resistor R is used to provide temperature compensation and in the present instance where it is desired to have the bus bar voltage vary inversely with the ambient temperature, a resistor having a pronounced negative temperature coefficient is employed so that the potential drop across the meter M tends to decrease as the ambient temperature drops, the voltage across buses 10 and 11 being regulated to maintain a constant voltage across the meter. It is to be understood, however, that the resistor R does not necessarily have a negative coefficient, and in applications wherein it is desirable to have the bus voltage increase with a rise in ambient temperature, a resistor having a pronounced positive temperature coefficient can be substituted for the resistor R. If the control circuit is to be used at a substantially constant ambient temperature, the resistor R can be dispensed with altogether.

The negative bus 12 is connected to the control electrode $g1$ of a vacuum tube V1 which forms the first stage of a two stage amplifier. The common terminal of the meter M and the resistor R is connected with the cathode $k1$ through a choke L and two resistors $r1$ and $r2$. The resistors $r1$ and $r2$ are also connected in series with resistors $r3$ and $r4$ to form a bleeder resistor across the terminals $d$ and $c'$ of a direct power supply. The direct potential across the bleeder resistor is maintained substantially constant by connecting a voltage regulator glow tube Vr in parallel with the bleeder resistor and interposing a series resistor r5 between the bleeder resistor and the negative power supply terminal d. It will be noted that the voltage drop across the resistors r1 and r2 opposes the fraction of the bus bar potential appearing across the meter M, the difference being applied to the control electrode g1 and cathode k1 of the tube V1. The opposing standard voltage is adjusted to bring the indicator of the meter M to its mark by making the resistor r2 variable. Two capacitors c1 and c2 located on either side of the choke L cooperate therewith as a filter so that the pulses in the bus potential applied to the control electrode g1 are substantially eliminated. A third capacitor c3 is connected in parallel with the resistors r1 and r2 for filtering the standard potential.

The anode a1 of the tube V1 is connected directly to the control electrode g2 of a second stage amplifier tube V2, the anode operating voltage being furnished from the positive direct power terminal c' through a voltage reducing resistor r6. To maintain the current through the heater h of the tube V1 sufficiently constant so that variations do not affect the operation of the control circuit, it has been found necessary to connect a ballast tube B in series with the heater and the secondary winding of a transformer T2 which supplies power to the heater. The primary winding of the transformer T2 is connected either to the alternating power supply mentioned heretofore or to any other suitable source of alternating current.

The cathode k2 of the tube V2 is connected to the common junction of the resistors r3 and r4. The anode a2 is directly coupled to both control electrodes g3 of a double triode control vacuum tube V3. The anode potential is supplied from the positive direct power supply terminal c' through a voltage reducing resistor r7. Both cathodes k3 are connected to the positive terminal c' of the direct power supply. The anodes a3 are linked respectively to the ends of the secondary winding of a transformer T3 whose center tap is connected to the cathodes k3 through the direct current core saturating winding zd of the reactor Z. The primary winding of the transformer T3 is energized from the alternating power supply terminals a and c.

The operation of the above described circuit can best be understood by assuming the bus bars 10 and 12 to be loaded, for example by the charging current drawn by batteries such as are indicated schematically at Ba, and to consider the action of the circuit when one or more of such batteries has been removed. Such decrease in load causes the bus voltage to rise and, as the bucking voltage from the bleeder resistors r1 and r2 remains constant, the rise in bus voltage causes the control electrode g1 to become relatively more negative thus decreasing the current flow through the tube V1 and its anode circuit resistor r6. The resulting decrease in the IR drop across the resistor r6 causes the potential of the control electrode g2 to become relatively more positive thus increasing the current flow through the tube V2 and its anode resistor r7. The resulting increased potential drop across the resistor r7 causes the control electrodes g3 of the tube V3 to become more negative.

Depending upon the instantaneous polarity of the alternating current at the terminals a and c, one or the other of the triodes of the tube V3 is conducting so that a pulsating direct current flows through the winding zd of the saturable reactor Z. The above mentioned increase of the potential drop across resistor r7 being impressed upon the control electrodes g3 decreases the average current flow through the triodes of the control tube V3 thus decreasing the current flow through the reactor saturating winding zd. The resulting reduction of the saturation of the reactor core increases the effective reactance of the load windings za1 and za2 thus decreasing the voltage applied to the primary winding of the transformer T1. The voltage applied to the bus bars 10 and 12 by the secondary windings is proportionally reduced thereby counteracting the tendency of the bus voltage to rise upon reduction of the load. Conversely if the electrical load upon the bus bars 10 and 12 is increased the control electrode g1 becomes relatively less negative so that the action of all the circuit elements is reversed with respect to that described above to increase the saturation of the reactor core to raise the bus bar voltage.

The above described functioning of the control circuit assumes that the ambient temperature remains constant so that the resistor R does not affect the operation. If, however, the temperature should rise, the effective ohmic value of the resistor R decreases so that the voltage drop across the meter M increases for a given bus loading. As the voltage across the meter M affects the voltage applied to the control electrode g1, an increase in such voltage due to a temperature rise affects the control circuit in the same manner as if the load had been decreased so that the circuit responds in a manner similar to that described in detail above to lower the bus voltage. Conversely if the ambient temperature drops the effective ohmic value of the resistor R increases so that the voltage drop across the meter M which effects the voltage to the control electrode g1 decreases thus raising the voltage applied to the bus bars 10 and 12.

Figure 2:
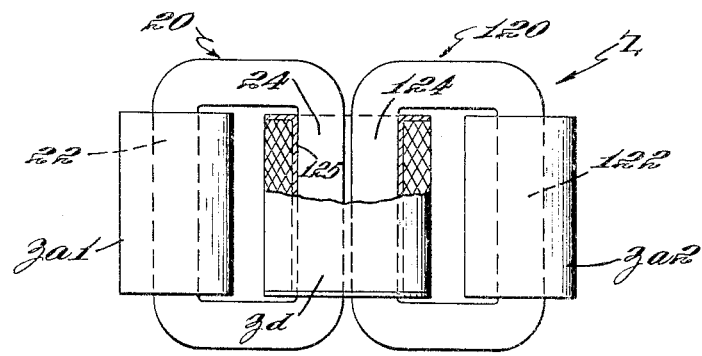
Figs. 2, 3 and 4 are side elevation views with portions broken away of various types of saturable core reactors.

In Fig. 2 is shown the details of a saturable core reactor Z for use in the above described circuit. The reactor Z comprises two conventional laminated core portions 20 and 120, each of which forms a closed magnetic circuit. The core portions 20 and 120 are arranged side by side so that one leg of each thereof is adjacent a similar leg of the other portion. The outer legs 22 and 122 of the core portions 20 and 120 have wound thereupon the alternating current windings za1 and za2 respectively. The core saturating direct current winding zd is disposed about the two adjacent legs 24 and 124. By arranging the direction of the windings za1 and za2 so that the alternating fluxes produced thereby in the adjacent core legs 24 and 124 are made to oppose each other at the fundamental frequency of the power in the windings, no effect therefrom is produced in the saturating direct current winding zd. However, the instantaneous alternating flux produced by one of the alternating current windings is in the same direction as the direct flux from the saturating winding zd while the alternating flux from the other alternating current winding opposes the direct flux so that the magnetization in the two core portions 20 and 120 is of different magnitude. Due to the nonlinearity of the magnetic saturation curve of the core material, a harmonic voltage is generated in the winding zd which opposes the flow of direct current from the tube V3 through winding zd so that a much higher direct control voltage must be applied to the winding than would otherwise be necessary. As the energy in the harmonic alternating flux is comparatively low, it can be dissipated in a short circuited winding, thereby to lower the voltage which must be applied to the saturating winding zd. This can be accomplished by shunting several turns of the winding zd, but a preferable manner of providing a low resistance circuit which is influenced by substantially the same flux as the winding zd, is to wind the coils on a form such as the spool 125 made of a low resistance electrically conducting material such as copper.

Figure 3:
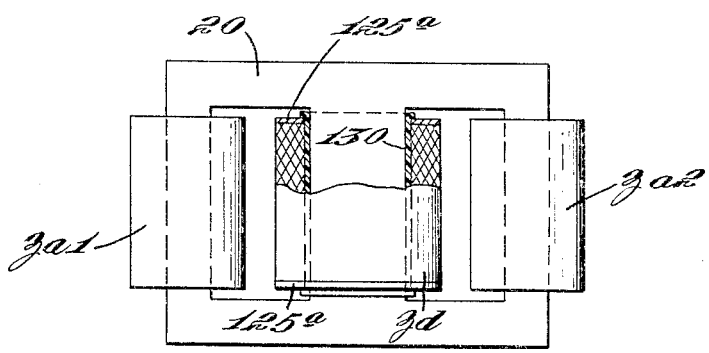
Figure 4:
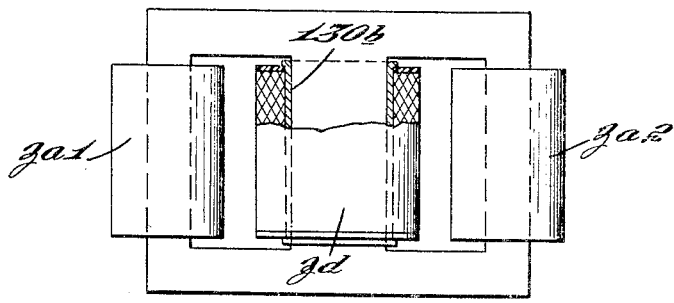

In Fig. 3 an alternate form of core construction is shown wherein the adjacent legs 24 and 124 are not separated. The coil zd is wound upon a plastic sleeve 130; and washers 125a of a conducting material are arranged at either end of the coil to act as short circuiting windings. In Fig. 4 the saturation coil zd is wound upon a conducting sleeve 130b which acts as the short circuited winding.

It should be understood that the present disclosure is for the purpose of illustration only and that this inven-

We claim:

1. For charging a load of storage batteries under wide variations of load and temperature, an electronic control circuit comprising load terminals for connection to said batteries, a power supply connected across said terminals, a variable impedance connected to control the voltage output of said power supply, a voltage amplifier having input means and output means, and a temperature responsive resistance and a relatively high resistance connected in series across said load terminals so that a potential drop dependent on said load exists across said high resistance, said high resistance and input means being connected in a loop so that variations in said potential drop due to load variations vary the potential difference between said input means, said output means being connected to said impedance to vary said impedance and control said power supply output proportionally to said load variation and variation of said potential drop, and said temperature responsive resistance responding to temperature changes to produce a change in the voltage drop across said high resistance independently of load variations, whereby the output of the power supply may be corrected according to variations in temperature independently of the number of batteries being charged.

2. For charging a load of storage batteries under wide variations of load and temperature, an electronic control circuit comprising load terminals for connection to said batteries, a power supply connected across said terminals, a variable impedance connected to control the voltage output of said power supply, a voltage amplifier having input means and output means, and a temperature responsive resistance and a relatively high resistance connected in series across said load terminals so that a potential drop dependent on said load exists across said high resistance, said high resistance and input means being connected in a loop so that variations in said potential drop due to load variations vary the potential difference between said input means, said output means being connected to said impedance to vary said impedance and control said power supply output proportionally to said load variation and variation of said potential drop, and said temperature responsive resistance being connected outside said loop and responding to temperature change to produce a change in the voltage drop across said high resistance independently of load variations, whereby the output of the power supply may be corrected according to variations in temperature independently of the number of batteries being charged.

3. For charging a load of storage batteries under wide variations of load and temperature, an electronic control circuit comprising load terminals for connection to said batteries, a power supply connected across said terminals, a variable impedance connected to control the voltage output of said power supply, a voltage amplifier having input means and output means, and a temperature responsive resistance and a meter including a high resistance connected in series across said load terminals so that a potential drop dependent on said load exists across said meter, said meter and input means being connected in a loop so that variations in said potential drop due to load variations momentarily vary the potential difference between said input means, said output means being connected to said impedance to vary said impedance and control said power supply output proportionally to said load variation and variation of said potential drop, and said temperature responsive resistance responding to temperature change momentarily to produce a change in the voltage drop across said meter independently of load variations, whereby the output of the power supply may be corrected according to variations in temperature independently of the number of batteries being charged.

4. For charging a load of storage batteries under wide variations of load and temperature, an electronic control circuit comprising load terminals for connection to said batteries, a power supply connected across said terminals, a variable impedance connected to control the voltage output of said power supply, an electronic voltage amplifier having input means and output means, a negative temperature responsive resistance and a meter including a high resistance connected in series across said load terminals so that a potential drop dependent on said load exists across said meter, and a source of steady potential connected in a loop including said meter and input means to oppose said potential drop, so that variations in said potential drop relative to said steady potential due to load variations momentarily vary the potential difference between said input means, said potential difference having a normal value when said potential drop and steady potential differ by an amount proportional to the correct power supply output voltage, said output means being connected to said impedance to vary said impedance and control said power supply output proportionally to said load variation and variation of potential drop, and restore said potential difference to normal value, said meter having an index mark indicating normal value of said potential drop and potential difference, and said temperature responsive resistance being connected outside said loop and responding to temperature changes momentarily to produce a change in the voltage drop across said meter independently of load variations, whereby the output of the power supply may be corrected according to variations in temperature independently of the number of batteries being charged.

5. The control circuit according to claim 4 characterized by means for adjusting said source of steady potential so as to establish said potential difference at normal value as indicated by said meter.

References Cited in the file of this patent

UNITED STATES PATENTS

| Number | Name | Date |
|---|---|---|
| 1,567,797 | Frank | Dec. 29, 1925 |
| 2,223,737 | Moses | Dec. 3, 1940 |
| 2,331,131 | Moyer | Oct. 5, 1943 |
| 2,331,411 | Milarta | Oct. 12, 1943 |
| 2,399,266 | Stiefel | Apr. 30, 1946 |
| 2,423,114 | Potter | July 1, 1947 |
| 2,431,312 | Cronvall | Nov. 25, 1947 |
| 2,488,711 | Cross | Nov. 22, 1949 |
| 2,503,039 | Glass | Apr. 4, 1950 |
| 2,552,203 | Morgan | May 8, 1951 |